Sept. 20, 1960  G. W. BOHANNON ET AL  2,953,103
COMBINATION COACH AND SLEEPING CAR
Filed Oct. 31, 1957  12 Sheets-Sheet 3

Sept. 20, 1960 G. W. BOHANNON ET AL 2,953,103
COMBINATION COACH AND SLEEPING CAR
Filed Oct. 31, 1957 12 Sheets-Sheet 5

INVENTORS.
George W. Bohannon &
By: Walter Scowcroft
Mann, Brown & McWilliams
Attys.

United States Patent Office 2,953,103
Patented Sept. 20, 1960

2,953,103

COMBINATION COACH AND SLEEPING CAR

George W. Bohannon, Oak Park, and Walter Scowcroft, Palos Heights, Ill., assignors to The Pullman Company, a corporation of Illinois Filed Oct. 31, 1957, Ser. No. 693,746

11 Claims. (Cl. 105—315)

Our invention relates to a combination coach and sleeping car, and in general is an improvement of the combination coach and sleeping car described in our copending application Serial No. 518,791, filed June 29, 1955, now abandoned of which this application is a continuation in part.

Said copending application, the disclosure of which is hereby incorporated by reference, discloses a railroad passenger car comprising a plurality of compartments or rooms that serve both for day coach and sleeping car accommodations. The compartments or rooms are provided with seats, folding beds, and toilet facilities, and are so arranged that they can be publicly exposed for coach use with the toilet facilities being kept locked during coach use. If sleeper service is desired, they may be made completely private with full toilet facilities conveniently available. The folding beds each include a one-piece mattress and toilet facilities are fully available without bed adjustment during the night.

The disclosure of said copending application contemplates the use of a removable panel in the aisle wall of each compartment or room, said panel being applied to said aisle wall when the compartment or room is in sleeper or first class service, to insure complete privacy; when the compartment or room is in coach service, the panel is removed from the aisle wall to heighten the effect of lack of privacy. Said disclosure also relates to double compartments that provide sleeping accommodations for two passengers. In accordance with said disclosure, the compartment beds are mounted side by side in the compartment, which means that the use of double rooms would not increase the sleeping capacity of the car, as one double room or compartment occupies substantially the same space that two single compartments would.

A principal object of our present invention is to improve the double compartment arrangement so that the number of beds available in a car plan employing double compartments may be increased without inconvenience or discomfort to passengers.

A further object of the invention is to provide an improved arrangement for effecting compartment privacy or the lack thereof.

Yet a further object of the invention is to provide adequate wardrobe and baggage space for compartments of the type described in said application.

Still a further object of the invention is to provide improved compartment seats particularly adapted for use in our improved double compartments, but which are of general application.

Other objects, uses, and advantages will be obvious or become apparent from a consideration of the following detailed description and the appended application drawings.

INVENTION OF COPENDING APPLICATION

In order to place our present invention in its proper setting, Figures 1–3 and 11b have been adopted bodily from the drawings of said copending application, and the structure therein shown will be first described.

Figure 1:
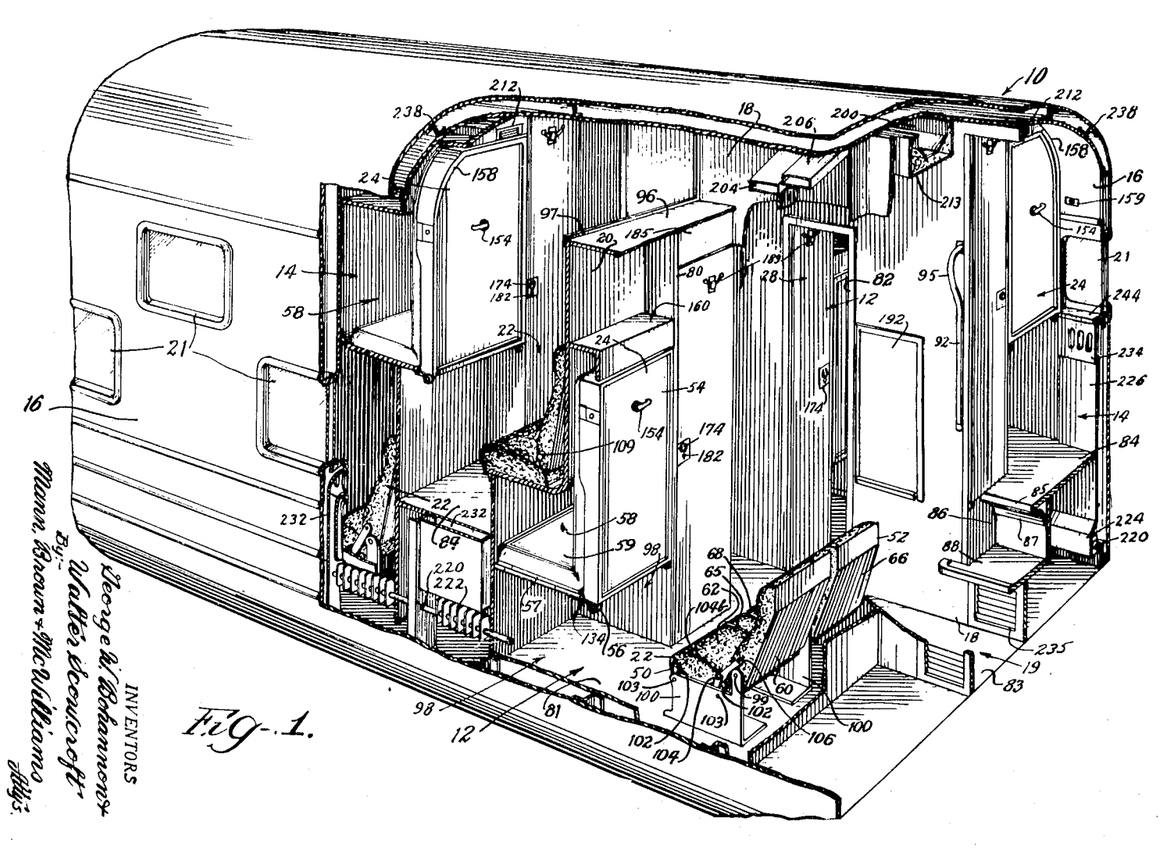
Figure 1 is a perspective view of a portion of the passenger car disclosed in said copending application, showing the compartments arranged for coach use.
Figure 2:
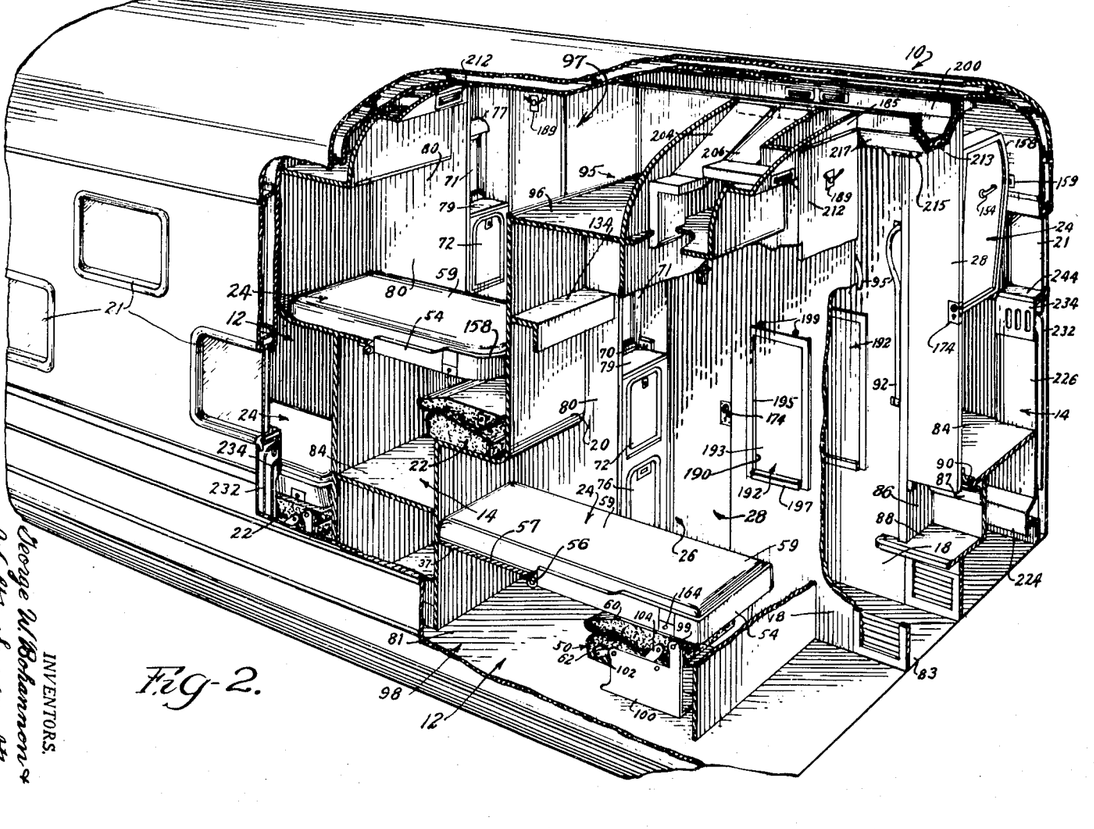
Figure 2 is a view similar to that of Figure 1, but showing the compartments arranged for sleeping service.

Referring now more particularly to Figures 1 and 2 of the drawings, reference numeral 10 generally indicates a railway car in which one form of the invention described in said copending application has been embodied, wherein a plurality of single lower compartments 12 and single upper compartments 14 are defined by the vehicle sidewalls 16, aisle walls 18, which also define a centrally disposed aisle 19, and transverse side panelling 20. The car 10 has the usual exterior structure including wheels resting on railroad rails in the usual manner.

As indicated in Figures 1 and 2, each compartment is provided with a window 21, one or more seats generally indicated as a whole for each compartment at 22, preferably of the folding or collapsing type, a folding bed 24, toilet facilities generally indicated at 26 (see Figure 2) and a compartment door 28.

Since it is desirable to provide a maximum number of compartments in a minimum of space, we arrange the upper and lower single compartments 12 and 14 on each side of the car so that they slightly overlap each other. As shown in Figures 1 and 2, the seats 22 and folding beds 24 of each compartment are spaced on opposite sides of the compartment. The beds 24 and window side seats 50 of the set of seats 22 are positioned adjacent the compartment window 21, smaller seats 52 of the set of seats 22 being positioned between the larger seat 50 and the aisle wall 18. The folding beds 24 comprise a bed frame 54 pivotally mounted as at 56 in a manner more particularly described in said copending application to swing toward and away from the larger seat 50, said bed frame defining with the adjacent side panelling 20 and horizontal panel 57, a bed pocket 58 in which the one-piece mattress 59, together with blankets and the like for the bed, are stored when not in use, somewhat as shown, for instance, in Figure 1. It will be noted that the side panelling 20 is so arranged that the bed pockets 58 of the upper compartments are positioned over the seats 22 of the next adjacent lower compartments and the bed pockets 58 of the lower compartments are positioned under the seats 22 of the next adjacent upper compartments.

The larger seats 50 of each single compartment comprise a folding or collapsible back cushion 60 and a bottom cushion 62. The smaller seats 52 comprise a fixed back 66 and a pivotally mounted bottom 68, and these seats 50 and 52 together extend completely across the side of the compartment on which they are positioned. The seats 50 are larger since it is contemplated that the bed frames 54 in their unfolded position will be disposed over them as indicated, for instance, in Figure 2. Since seats 50 are larger than normally would be required for a passenger, and seats 52 look somewhat small compared to seats 50, these seats preferably are upholstered and beaded to create the illusion that seats 52 are larger than they really are. For instance, a bead 65 may be formed in the exposed surfaces of cushions 60 and 62 of each seat 50, thereby forming a medial zone in seats 22 adapted to be used by both coach passengers using same.

Figure 11:
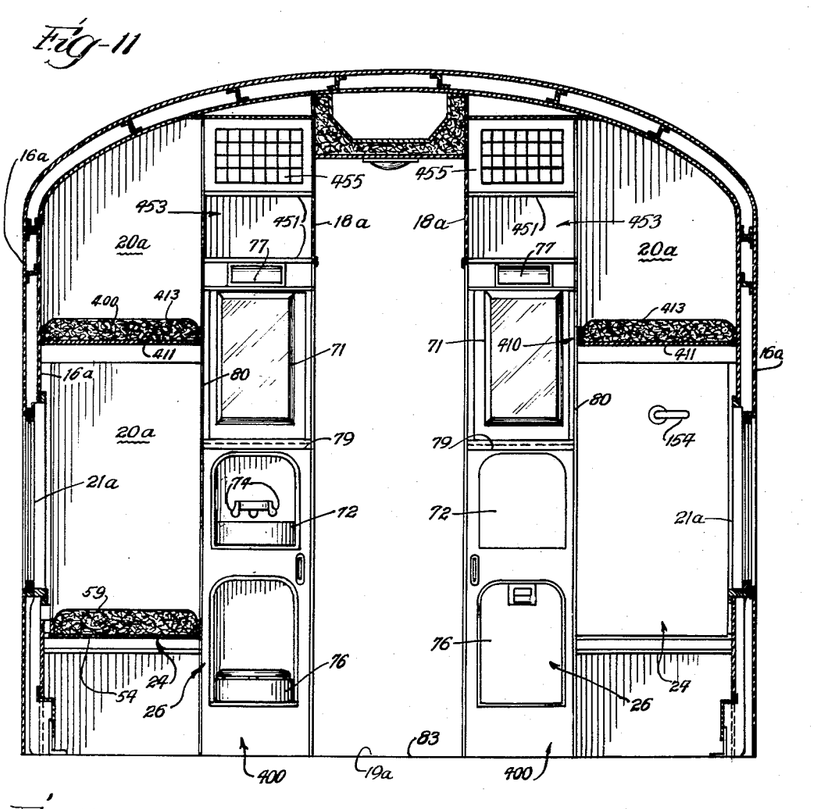
Figure 11 is a diagrammatic cross-sectional view along line 11—11 of Figure 7, the compartment doors being omitted.
Figure 11A:
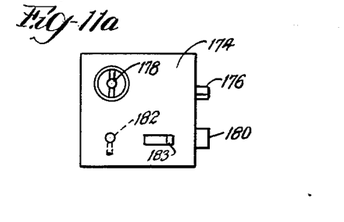
Figure 11a is an elevational view of a lock employed in the illustrated embodiments of the invention.
Figure 11B:
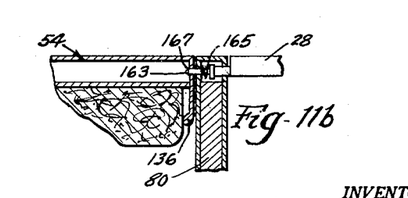
Figure 11b is a fragmental horizontal sectional view illustrating a device (described in our said copending application) for locking the compartment bed frame in position when the compartment door is positioned for coach service.

The toilet facilities 26 (see Figure 2) are mounted on a vertical panel 20 alongside the bed frame 54 and opposite the smaller seat 52 and each comprise in the illustrated embodiment a mirror 71, a folding washbowl 72 including levers 74 (see Figure 11) for turning on hot and cold water, and a folding water closet or toilet 76, all mounted under a suitable lamp 77 (see Figure 11). The washbowl and water closet or toilet are preferably a combined unit sold under the trademark "Travel-Lav" manufactured by Angelo Colonna of Philadelphia, Pennsylvania. Both the washbowl 72 and the water closet or toilet 76 fold down to a substantially horizontal position when they are to be used, as shown more particularly in Figure 11. As best shown in Figure 11, the top of the "Travel-Lav" unit forms a shelf 79 just below the mirror 71, at one side of which an electrical outlet 70 (see Figure 2) may be installed for electric razors and the like. Between the toilet facilities 26 and the bed frame 54, a vertical, longitudinally extending panel 80 is mounted to form part of the adjacent bed pocket 58 and for important additional purposes hereinafter made clear.

The aisle walls 18 are formed with doorways 82 providing access to the respective compartments, with the doorways 82 of the lower compartments being level with the floor 83 of aisle 19 as well as the floors 81 of these compartments, and the doorways 82 of the upper compartments being level with the floors 84 thereof. Just below the doorways 82 of the upper compartments recesses 86 are formed in which a single step 88 is mounted in any suitable manner. As indicated in Figure 1, the floors 84 of the upper compartments are cut back slightly to provide foot room for passengers entering these compartments, the area of the floors 84 adjacent the cut back portion comprising a second ledge or step 85 to which passengers step in entering or leaving the upper compartments. Suitable reinforcing means 87 may be employed under ledge or step 85, as desired. The doors 28 of the upper compartments are provided with guards or cover plates 90 to cover the cut back portions of floors 84 when the doors are closed. These guards or plates 90 are curved to prevent a passenger from stepping on or at least applying appreciable weight against them, since they are disposed over the cut back portion of the floor in the extreme compartment closed position, and this might otherwise tend to throw the doors out of line. Suitable hand rails 92 are fixed to the aisle walls 18 on either side of doorways 82 of the upper compartments; a similar hand rail may be mounted just inside these doorways if so desired. As shown in Figures 1 and 2, the hand rails are formed with an upper curved portion 95 especially adapted for gripping by a passenger about to leave the upper compartments.

A baggage compartment 95 (see Figure 2) is provided adjacent each upper compartment by securing a horizontal panel 96 between the two slide panels 20 defining the upper portion of the lower compartment, and providing an opening 97 in the portion of the panel 20 extending above the seat 22 of the upper compartments. In the lower compartments, a space 98 for baggage is formed by the panel 57 forming a part of the bed pocket for these compartments.

The seats 50 of the lower compartments are of special significance since they are so arranged that the bottom cushions 62 thereof are lowered when the back cushions 60 thereof are folded into collapsed or lowered position. As disclosed in said copending application, the back 60 of each lower compartment seat 50 is pivotally mounted by a suitable pin 99 between side angle frames 100, and that the bottom cushion 62 is connected to each frame 100 through parallel links 102 pivotally connected to said frames 100 and the seat bottom 62 by suitable pins 103. Curved pusher arms 104, positioned on either side of the seat 50, are pivotally connected by a suitable pin to the back 60 at a point 106 above the horizontal axis about which the back pivots with respect to the frame 100, and are pivotally carried by the pins connecting the forward links 102 with the bottom cushion 62. Pusher arms 104 are also pivotally connected to cushion 62 by a pin 104b. Reference may be had to our said copending application for a complete description of this seat structure and its operation.

The seats 50 of the upper single compartments include a bottom cushion 62 fixed in place on top of the bed pocket of the adjacent lower, and a back cushion 60 pivoted at 109 between spaced brackets (not shown), cushion 60 normally being held in upright position by an appropriate catch.

Seats 52 of both the upper and lower single compartments comprise a fixed back cushion 66 and a pivotally mounted bottom cushion 68. When one desires to use water closet 76, it is unfolded to its down position and the bottom cushion 68 is pushed to an upright position about its pivotal mounting to provide additional leg room.

The bed frames 54 are provided with latching devices that are operated by handles 154; the latch devices (completely described in said copending application) are actuated by handles 154 to release the bed frames from the positions shown in Figure 1 for swinging to the positions shown in Figure 2, wherein the free ends of the frames rest on a suitable support fixed to the panelling 20 back of the cushions 60 (which, of course, are first swung to the positions of Figure 2). Safety devices 159 may be provided to insure that the bed frames do not come down on top of the passengers if the bed frame latches accidentally become unlatched.

The bed in each compartment is equipped with a suitable form of counterbalancing arrangement for ease of operation. Likewise each bed is equipped with a lock which operates in conjunction with the room door so that when the door is in the position to close off the toilet facilities for coach service, the bed is also locked in the closed position. Such an arrangement is diagrammatically illustrated in Figure 11b (see Sheet 7) wherein a latch bar 163 biased toward door 28 by a compression spring 165 is mounted in panel 80 between the toilet facilities 26 and bed frame 54 of each compartment. Upon positioning the door 28 for coach service, the latch bar 163 is engaged by the door 28 and is urged into a suitable hole 167 formed in the bed frame. When the door 28 is moved to open up the toilet facilities, the latch bar 163 is withdrawn from the hole 167 by spring 165 and at the same time is positioned for engagement by the door 28 when the toilet facilities are to be closed off. A suitable strike plate (not shown) may be fixed to door 28 to engage the bar 163, if so desired.

To heighten the effect of privacy or lack thereof, the aisle wall of the compartments described in said copending application is formed with an opening 190 adjacent each seat 52, and an imperforate removable panel 192 is provided for insertion in each opening 190. The panels 192 may comprise an imperforate member 193 having flanges 195 secured to the sides and top thereof, and a grooved base member 197. Each panel is mounted in an opening 190 with the flanges 195 flush against the compartment side of the aisle wall 18 and the portion of the aisle wall 18 defining the lower side of the opening 190 received in the groove of member 197. Suitable latching means operated by a key adapted to be received in key holes 199 (see Figure 2) retain the panel in the mounted position. The panels 192 would be removed when the compartments are to be used as coach seats and stored in the compartment bed pockets, but would be applied to provide complete privacy when sleeping service is desired.

The doors 28 are secured to the aisle walls 18 in the doorways 82 in any suitable manner for swinging or pivoting movement between the extreme open and closed positions illustrated most clearly in Figures 1 and 2, conventional lock 174 being employed to lock the door in the desired position. The lock normally includes a latch bar 176 operable by handles 178 on either side of the lock and a latch bar 180 operable by a key adapted to be received in the key hole 182 formed on the outer surface of the lock, and a sliding angle handle 183 on the other side of the lock. The lock 174 is fixed to the door with the key hole 182 facing outwardly, or toward the aisle 19, so that the car attendant can lock the door 28 with a key in either the extreme closed or open position. In the extreme open position shown in Figure 1, the door 28 blocks the toilet facilities 26, the latch bar 180 being received in a suitable slot or opening formed in the side of the panel 80. In the extreme closed position shown in Figure 2, the door is aligned with the aisle panelling 18 and the latch bars 176 and 180 may be actuated by the passenger to lock the door for sleeping privacy, the latch bars being received in suitable slots or recesses formed in the aisle panelling 18.

As seen in Figure 1, a panel 185 may be fixed between the panel 80 and aisle 18 of each compartment, above the door 28, in its extreme open position, to completely seal off the toilet facilities. The door frame or molding 186 may be lined with rubber-like material 188 (see Figure 8) to insure quiet operation of the door. The doors 28 preferably carry coat hanger fixtures 189 on both sides thereof so that a coat hanger is available whether the door is in open or closed position.

As disclosed in said copending application, the compartments are arranged for coach service when the doors 28 are locked in the extreme open position (see Figure 1). The back cushions 60 of the seats 50 and the bed frames 54 are in upright position and the panels 192 are removed from each opening and stored in the compartment bed pocket. On the other hand, complete privacy may be had by mounting panels 192 in position and unlocking the doors 28 for movement to the extreme closed position wherein they may be again locked by the passenger. If sleeping service is desired, the seats 50 of the compartments are moved to folded position and the bed frames 54 are swung down to the horizontal position, with the beds being made up in the usual manner.

It will be appreciated that the individual compartments are independent of each other, and that one or more of them may be made completely private for sleeping service while the remaining compartments are maintained in semi-public coach service.

Figure 3:
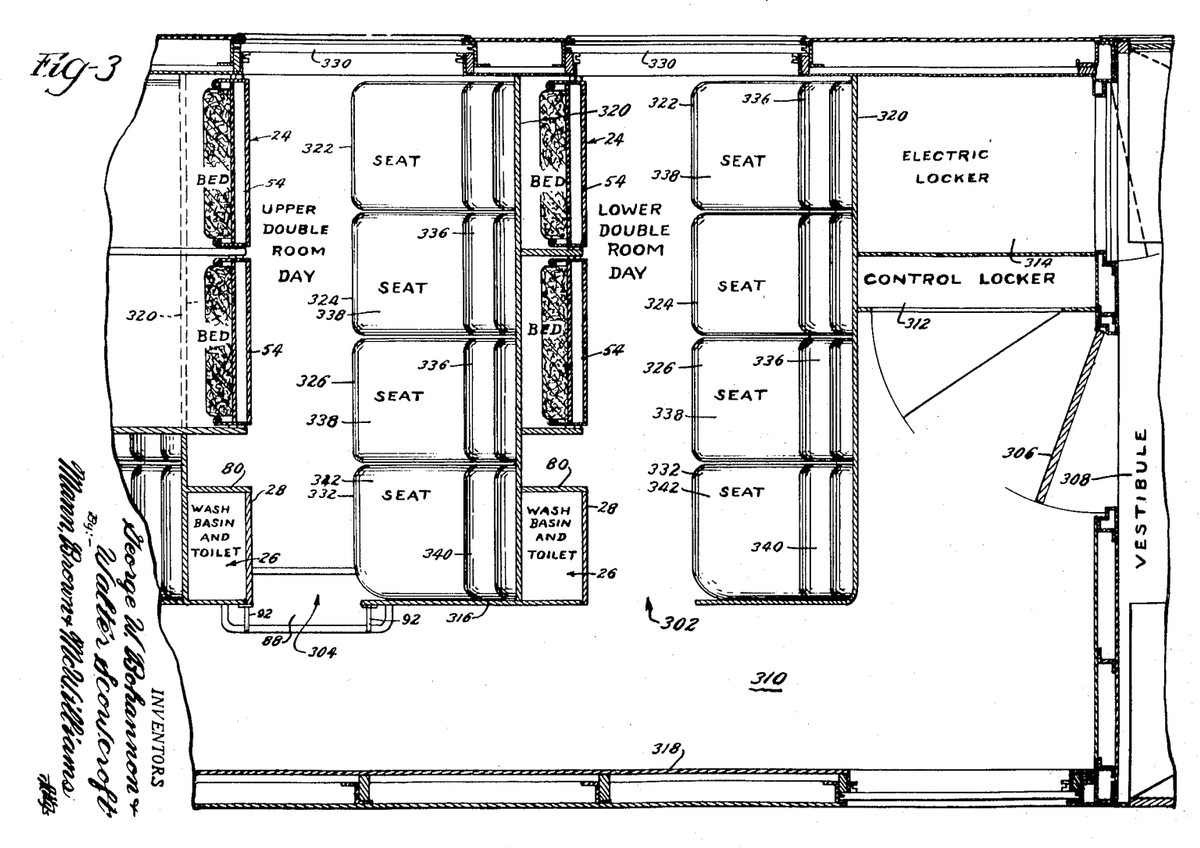
Figure 3 is a diagrammatic horizontal sectional view through one end of a railroad car employing the double compartments as disclosed in said copending application.

A modified form of the invention disclosed in said copending application is illustrated in Figure 3. In this form of the invention, double lower and upper compartments 302 and 304 are provided in a car 300 and are overlapped vertically in the same manner as compartments 12 and 14.

The car 300 may be provided with a door 306 leading from a conventional vestibule 308 to an aisle 310. Adjacent the door 306 suitable control and electric lockers 312 and 314 may be installed. The double compartments 302 and 304 are defined by aisle panelling 316, the side wall 318 and side panelling 320 in a manner similar to single compartments 12 and 14, except that they are provided with four seats instead of just two. In the embodiment of Figure 3, the seats 322, 324, and 326 nearest the compartment window 330 are arranged similarly to seats 50 of compartments 12 and 14, while the seat 332 nearest the aisle wall 310 is arranged similarly to seats 52. In the lower double compartments 302, the seats 322, 324, and 326 are constructed in the same manner that the seats 50 of lower compartments 12 are so that the bottom cushions thereof lower somewhat when the back cushions 336 are folded down over them. The back cushion 340 of the seat 332 is fixed, while the bottom cushion 342 thereof pivots in the manner described in connection with the bottom cushion 68 of seat 52 of compartments 12 and 14.

The compartments 302 and 304 are each provided with two bed frames 54 mounted to swing or pivot toward the seats 332, 324, and 326 in setting up the compartments for night service. The double compartments are otherwise arranged in a manner similar to compartments 12 and 14 already described, these compartments preferably including a latch device similar to that shown in Figure 11b for locking the beds in closed position when the compartment door is locked in open position.

The aisle 310 extends between the aisle wall panelling 316 and the sidewall 318 of the car. Figure 3 illustrating this embodiment of the invention shows the compartments 302 and 304 made up for coach service.

Improvements

Our improvements in the passenger car above described are shown more specifically in Figures 7 through 20. They relate to an improved double room arrangement including both a fixed and a folding bed, and to aisle wall panelling structures for better enhancing the effect of privacy or lack thereof in the double and single rooms. Additionally, we have provided improved coach seats that materially facilitate sleeper service in the improved double room compartments.

Improved double rooms

Figure 7:
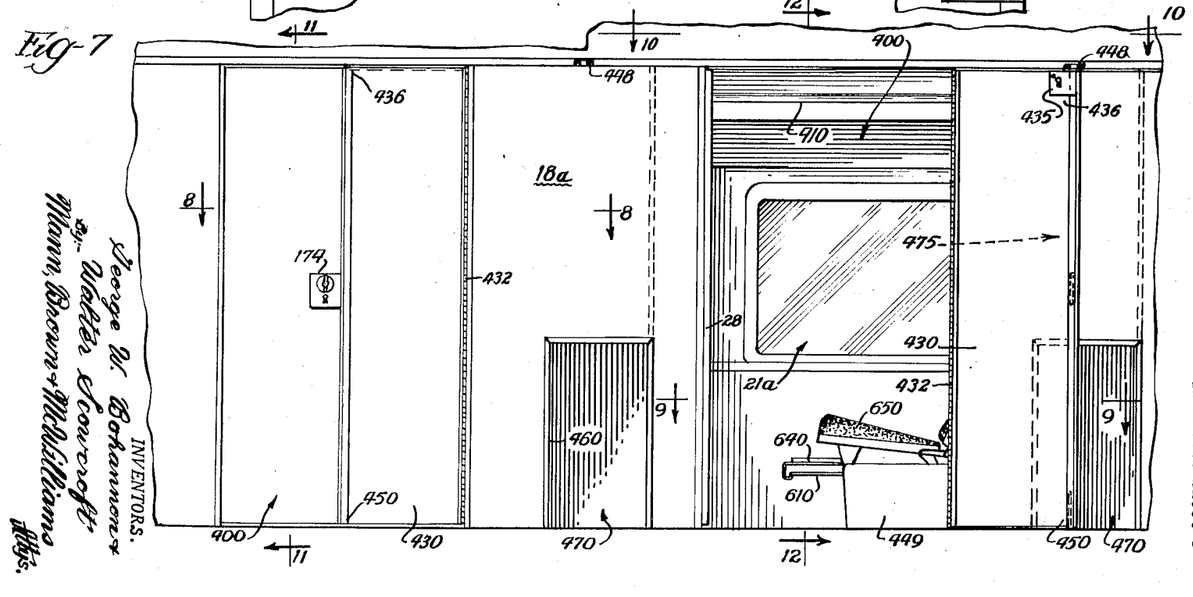
Figure 7 is an elevational view of the adjacent double compartments along line 7—7 of Figure 5, showing one double compartment arranged for coach use and the adjacent compartment closed for first class use.
Figure 12:
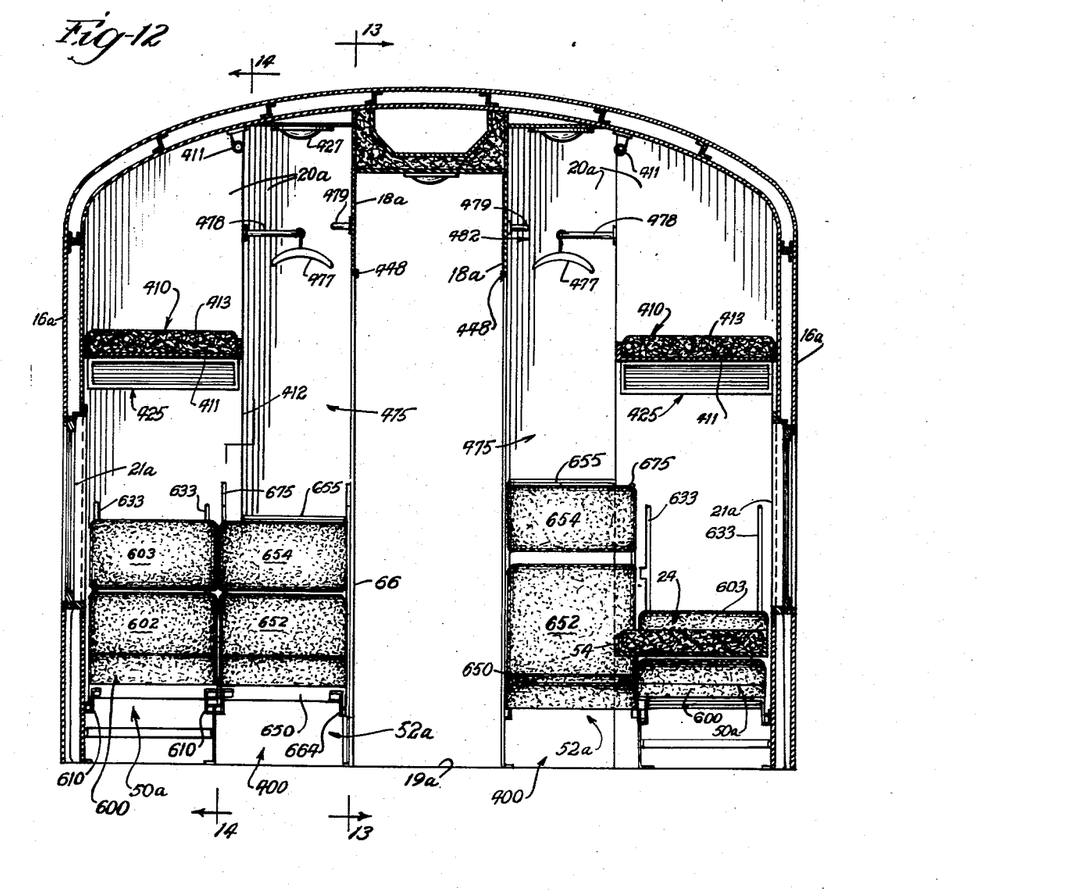
Figure 12 is a diagrammatic cross-sectional view along line 12—12 of Figure 7.
Figure 13:
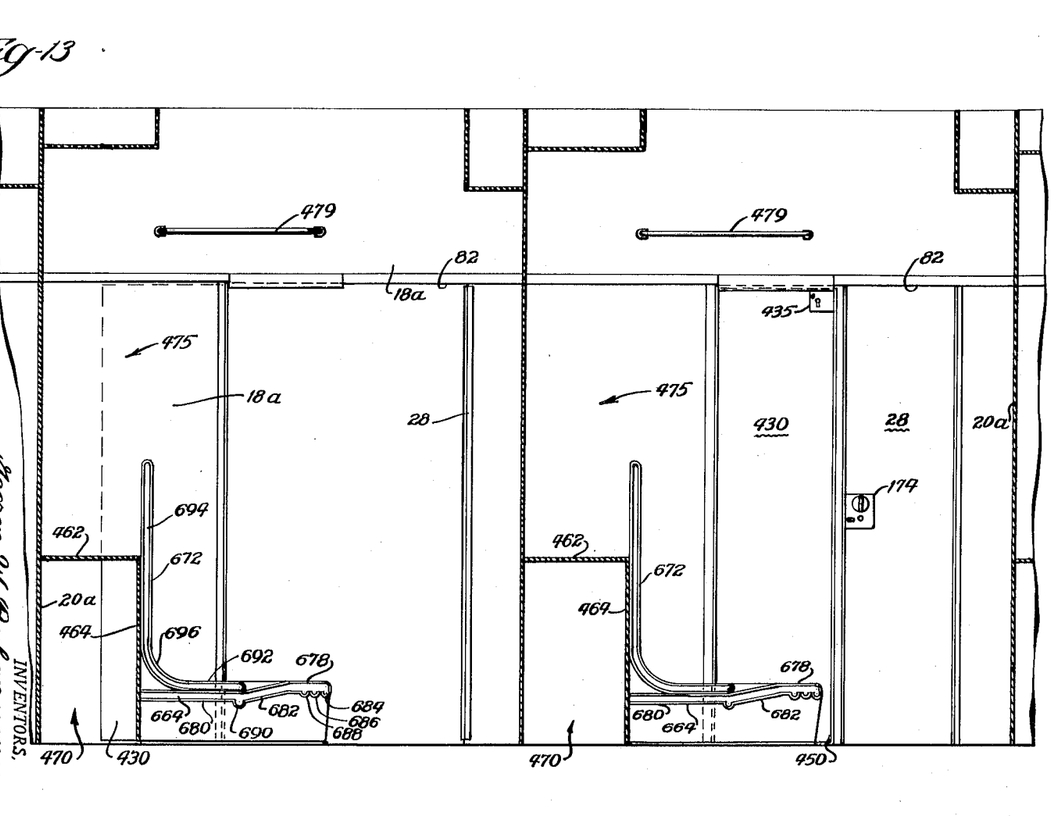
Figure 13 is a cross-sectional view along line 13—13 of Figure 12.

Reference numeral 400 of Figures 7, 11, and 12 indicates the improved double rooms. As seen in Figures 11 and 12, the double rooms 400 are arranged on either side of central aisle 19a in a manner similar to the way single compartments or rooms 12 and 14 are arranged. As indicated in Figure 7, adjacent rooms or compartments are at the same elevation; in accordance with the present invention, there is no overlapping of adjacent double room compartments.

Figures 7A, 7B, 8:
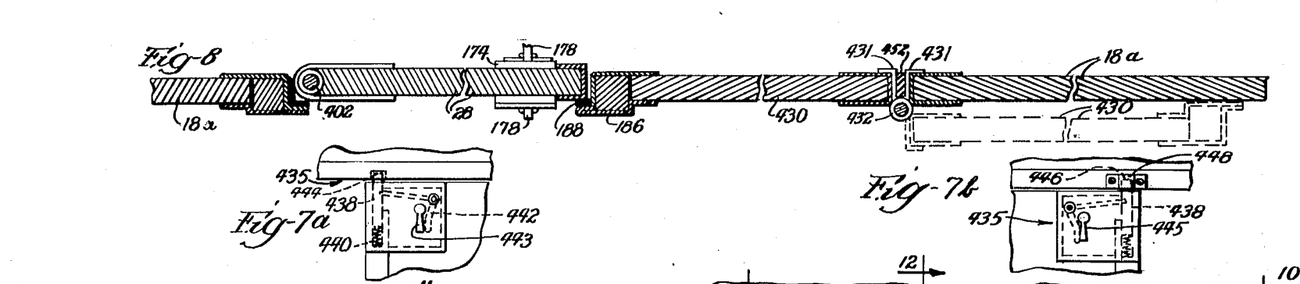
Figures 7a and 7b are fragmental cross-sectional views diagrammatically illustrating a latch device employed in the aisle wall structure shown in Figure 7.
Figure 8 is an enlarged cross-sectional view along line 8—8 of Figure 7.

As seen in Figures 11 and 12, the compartments 400 are each defined by aisle walls 18a, side panelling 20a, and the sidewall 16a of the car. Each compartment is provided with a window 21a of any suitable design and compartments 400 also include toilet facilities 26, improved seats 50a and 52a, and folding beds 24 that are described above. The toilet facilities 26 of compartments 400 are arranged in the same manner as in the compartments 12 and 14 described above, and the compartment door 28 is provided for cooperation with a panel 80 to lock or bar access to the toilet facilities when the compartment is in coach service. As seen in Figure 8, the door 28 is pivoted as at 402 by any appropriate hinge device to swing between the positions indicated in Figures 9 and 10. The door 28 includes the lock 174 described above.

Spaced horizontal panels 451 are secured between panel 80 and aisle wall 18a of each compartment to form a space 453 for hats and small parcels. Gratings 455 are provided for air circulation in the compartments. The top of the compartment door 28, in its closed position, is preferably vertically positioned just below the lower panel 451 of each compartment to prevent coach passengers from throwing trash into the toilet facility area over the top of the door 28 (when positioned for coach use).

The seats 50a and 52b of the compartments 400 are best illustrated in Figures 14–17, and as shown, are equal in width. Window seat 50a (see Figures 12, 14, and 17) comprises bottom cushion 600, back cushion 602, and head cushion 603 pivotally connected together as at 604. On each side thereof, the bottom cushion is provided with two arms 606; arms 606 carry rollers 608 that are respectively received in spaced, substantially horizontal channel members 610. Head cushion 603 carries two arms 612 on each side thereof that each carry rollers 614 respectively received in spaced vertically disposed channels 616. The lower flanges 618 of channels 610 are indented as at 620, 622, 624, and 626; indentation 620 is relatively deep, while indentations 622, 624, and 626 may be relatively shallow. As seen in Figure 18, tension spring 630 is connected to the head cushion 603 by links 632 to bias cushion 603, and thus the interconnected cushions of the seat 50a are biased upwardly of channels 616. Spring 630 is preferably mounted in a compartment 631 (see Figure 14) into which channels 616 extend, arms 612 of cushion 603 extending through slots 633 formed in the side panelling of the compartment.

Figures 19, 20:
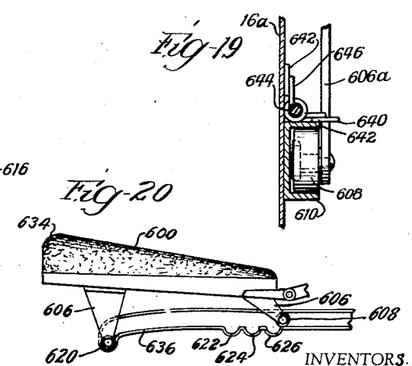
Figure 19 is a cross-sectional view along line 19—19 of Figure 14.
Figure 20 is a fragmental view illustrating a modification of the seat shown in Figure 16.

If a particular compartment arrangement makes it necessary or desirable to lower the portion 634 of cushion 600 when positioning same for sleeper service, the channel member 610 may be curved downwardly somewhat, as indicated in Figure 20.

It is preferable to lock seat 50a in its coach service position, and in accordance with our invention, this is done by employing pivotally mounted latch plate 640 (see Figures 14 and 19) that engages the forward arm 606 (marked 606a) which is adjacent the sidewall of the car. Latch plate 640 as illustrated is one leaf of two hinged members 642, secured together by hinge rod or pin 644, the other leaf being fixed to the sidewall of the car. Spring 646 biases latch plate 640 to the horizontal position shown in Figure 19, wherein it extends in front of arm 606a, to maintain seat 50a in the position shown at the right hand side of Figure 14. To move seat 50a to the position shown at the left hand side of Figure 14, plate 640 is lifted upwardly against the action of spring 646 so that arm 606a may be moved past it. When seat 50a is returned to coach service position, plate 640 snaps back in front of arm 606a when rollers 608 are lifted from indentations 620 and spring 630 draws cushions 600, 602, and 604 away from indentations 620.

Beds 24 when unfolded may rest on, for instance, suitable, appropriately braced, supports 641 fixed to channel members 610 and exposed when the cushions of seat 50a are moved from their coach service positions to their sleeping service positions (see Figure 14), though other types of support are contemplated.

Aisle seat 52a (see Figures 12, 13, 15, and 17) comprises bottom cushion 650, back cushion 652 and head cushion 654 pivotally connected together as at 656. Bottom cushion 650 includes a pair of formed depending arms 658 rotatably carrying rollers 660 which ride on flanges 662 of generally horizontal channel members 664; cushion 650 also includes a pair of depending rear arms 666 that rotatably carry rollers 668 riding on flanges 670 of L-shaped channel members 672. Head cushion 654 includes two pairs of spaced arms 674 that rotatably carry rollers 676 riding in the vertical portions of channel members 672, the arms 674 adjacent seat 50a extending through slots 675 into compartment 631 into which one channel member 672 extends.

Channel members 664 comprise vertically spaced horizontal portions 678 and 680 connected by inclined portion 682. The flanges 662 of these members are formed with rounded indentations or notches 684, 686, 688, and 690 to receive rollers 660 when the seat 52a is disposed in the various positions shown in Figures 15 and 17.

Channel members 672 include a generally horizontal portion 692 connected to a generally vertical portion 694 by smoothly curved portion 696.

The recesses 684, 686, and 688 of flanges 662 provide various coach service adjustment positions for seat 52a, while notch 690 positions the cushions of seat 52a to act as a ladder to provide access to fixed bed 410 about to be described.

The channel members may be fixed in their illustrated positions in any suitable manner.

Figure 14:
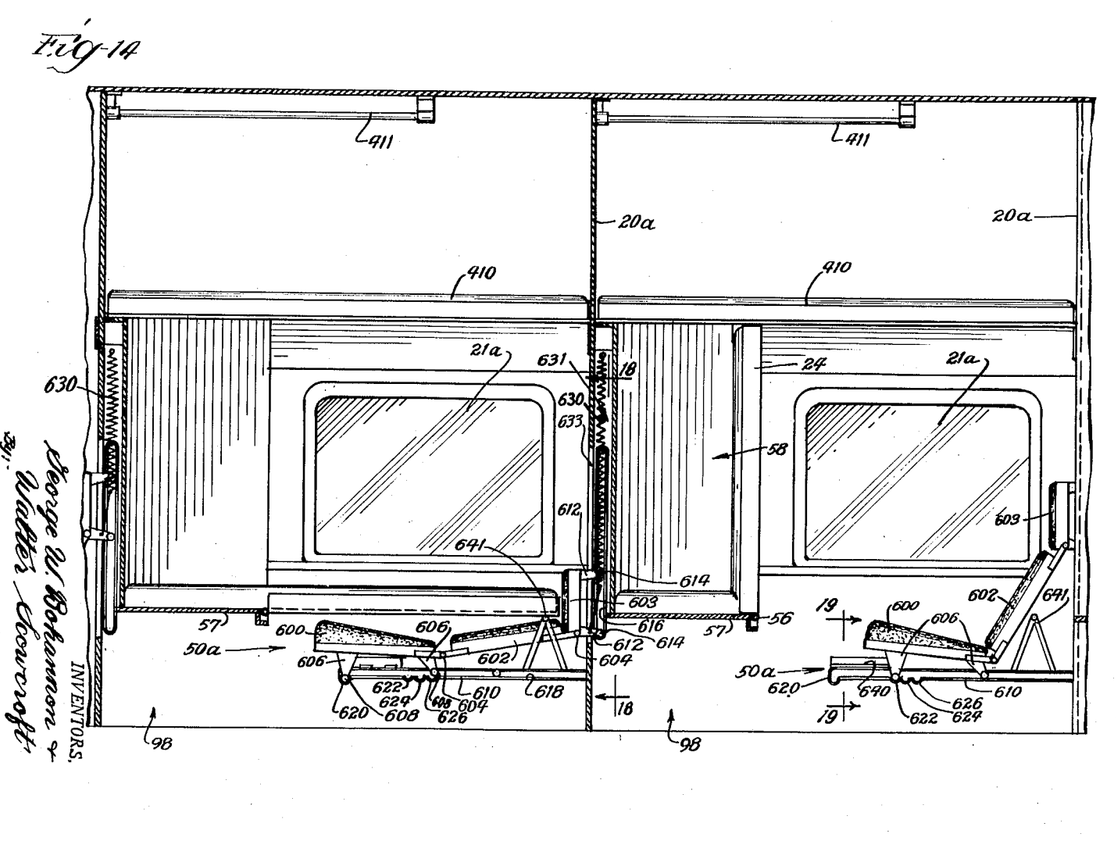
Figure 14 is a cross-sectional view along line 14—14 of Figure 12.
Figure 15:
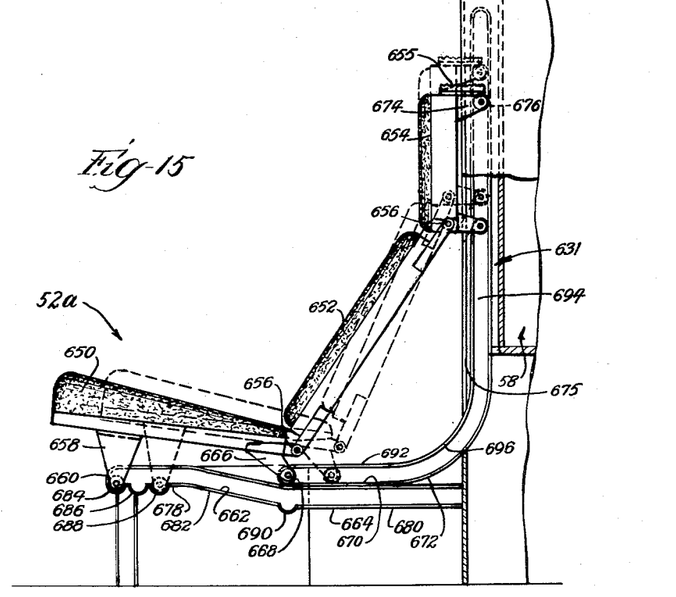
Figure 15 is a side elevational view of an aisle wall seat, showing same in several positions of adjustment.
Figure 16:
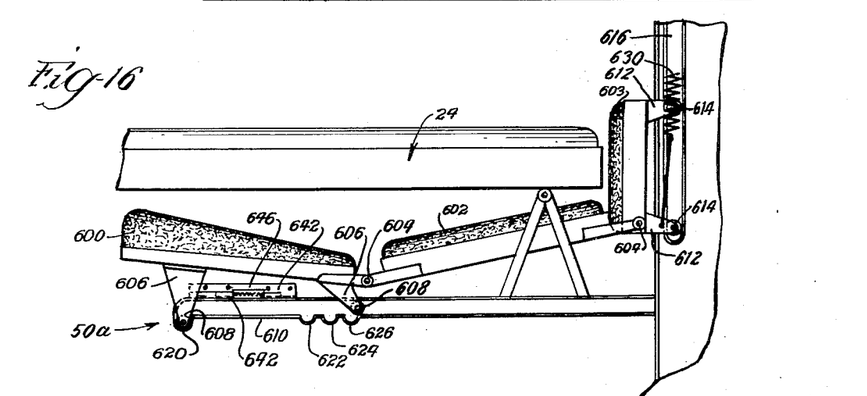
Figure 16 is a side elevational view of a window side seat, showing same positioned when the compartment is arranged for sleeper service.

In accordance with our present invention, each compartment 400 is provided with a stationary or fixed "upper" bed 410 (see Figures 11, 12, and 14). The beds 410 may be of any suitable design and are secured in the compartments 400 above the folding beds 24 and the seats 50a; they may include supporting shell 411 fixed to side panels 20a and sidewall 16a in any suitable manner, on which an appropriate mattress 413 and other bedding lie. The beds 410 are positioned sufficiently high so that bed frames 54 will clear them in swinging between their horizontal and vertical positions.

Immediately behind the seat 52a of the compartments 400, the aisle wall 18a is provided with an opening 460, and a generally horizontal panel 462 and a generally vertical panel 464 (see Figures 9 and 10) are mounted between panel 412 and the aisle wall 18a. Panel 412, which is spaced inwardly of the aisle wall 18a and extends generally parallel thereto, also extends between the ceiling and the floor of the compartment. Panels 412, 462, 464, and the side panelling 20a form a niche or compartment 470 for baggage. Panel 412 forms one side of the bed pocket of the adjacent compartment.

Figure 9:
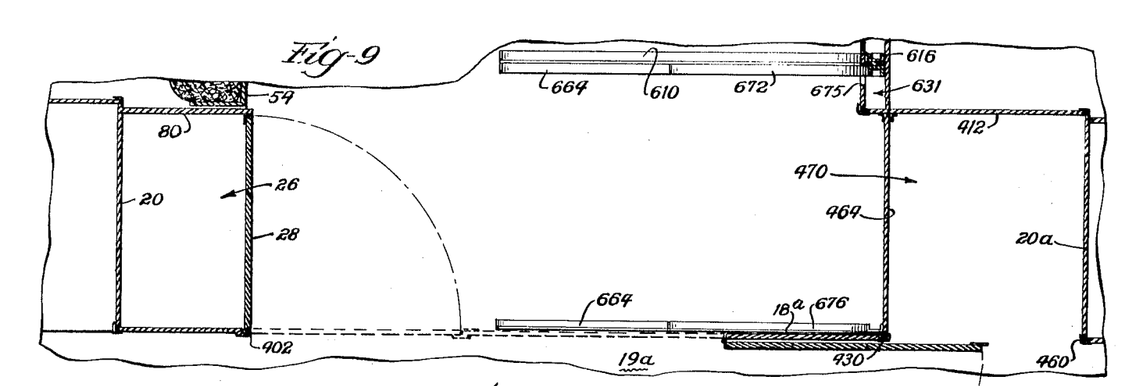
Figure 9 is a diagrammatic cross-sectional view along line 9—9 of Figure 7.
Figure 10:
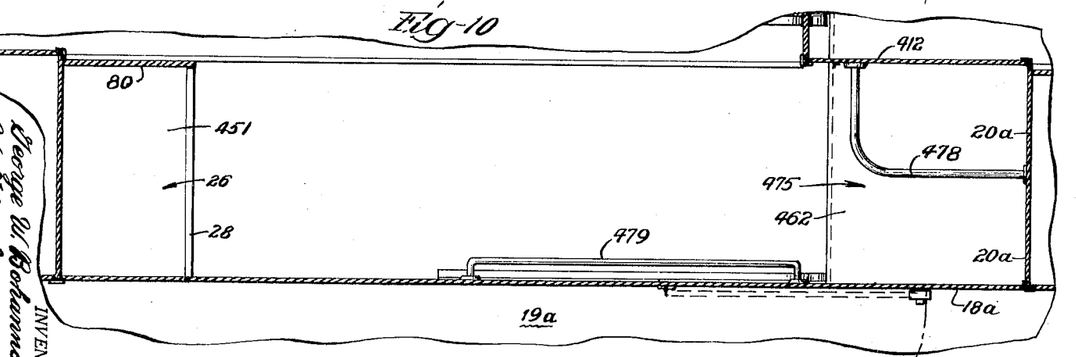
Figure 10 is a diagrammatic cross-sectional view along line 10—10 of Figure 7.

The space between horizontal panel 462, the panel 412, aisle wall 18a, and the ceiling of a compartment 400 defines a wardrobe 475 (see Figure 12) which is provided with right angled bars 478 for coat hangers 477 and the like to permit convenient storage of passengers' clothing when desired. Referring to Figures 9 and 10, it will be seen that the wardrobe space 475 is positioned immediately across the compartment 400 from the toilet facilities 26.

Figure 17:
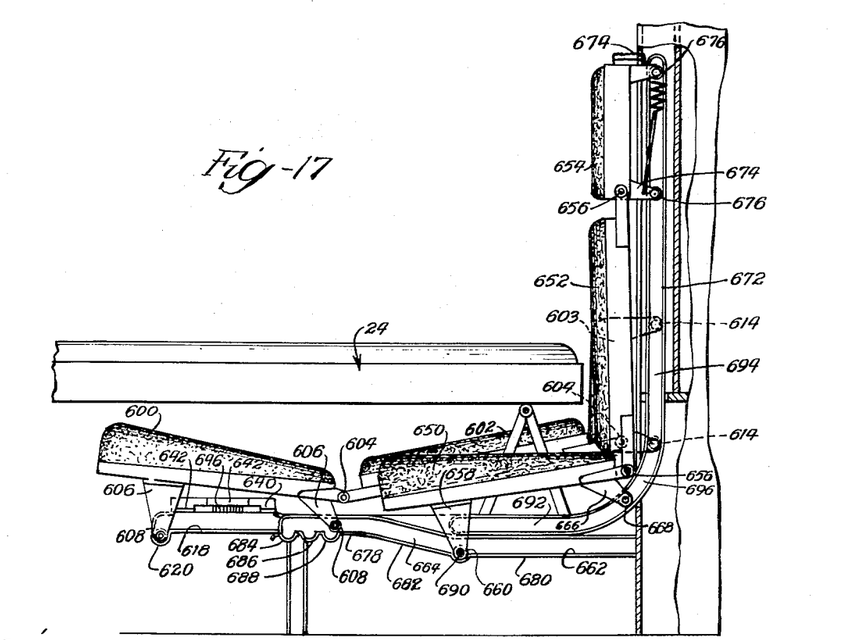
Figure 17 is a side elevational view, partially in section, of both the aisle wall and window seats of a compartment, the aisle wall seat shown in position for serving as a ladder to reach the compartment fixed bed, and the window seat being positioned as shown in Figure 16.
Figure 18:
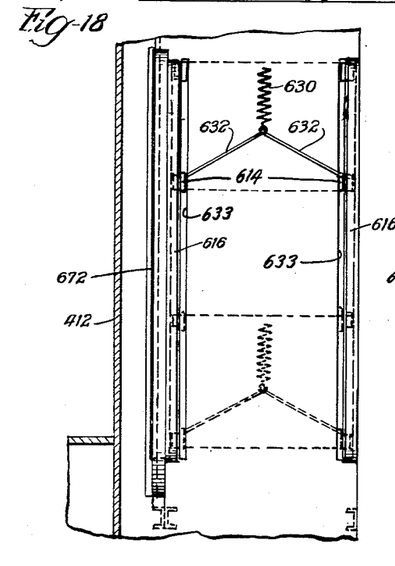
Figure 18 is a cross-sectional view along line 18—18 of Figure 14.

When cushions 650, 652, and 654 of seat 52a are arranged (as shown in Figure 17) to serve as a ladder for permitting the passenger to climb up to the fixed bed 410, the passenger may first step up to seat 650, then place his foot on top of head cushion 654 and grasp bar 478 as well as bar 479 provided on the aisle wall in space 420 and raise himself up to the fixed bed 410. The top of the head cushion may be protected by a rubber foot pad 655 or the like.

An appropriate form of lamp 425 is mounted above cushion 603 of seat 50a in each compartment 400, just underneath the stationary bed 410 (see Figure 12) and overhead lights 427 are positioned in the ceilings of the compartments. Of course, an appropriate lamp for the bed 410 may be mounted above same in any suitable manner.

Referring now to Figures 7 through 10, the aisle wall 18a of each compartment 400 includes a swinging panel or partition 430, in addition to the swinging door 28. The partition or panel 430 swings between the positions indicated in Figures 9 and 10. As shown in Figure 8, partition 430 is secured to the stationary part of aisle wall 18a by a continuous piano hinge 432 in which the leaf elements 431 thereof are suitably secured respectively to the panel 430 and aisle wall 18a, as by riveting or otherwise. The piano hinge 432 is mounted to permit the panel or partition 430 to swing from alignment with the aisle wall 18a out into the aisle 19a and then to a position that is generally parallel to the aisle wall 18a (see the dotted line position of Figure 8).

The panel 430 is provided with a suitable latching device 435 on its upper corner 436. The latching device diagrammatically illustrated in Figures 7a and 7b is of a suitable type and includes a latching bar 438 biased upwardly by an appropriate compression spring 440. Device 435 includes pivotally mounted crank element 442 for pressing bar 438 downwardly against the action of spring 440 to unlock upper corner 436. Element 442 is preferably actuated by an appropriate key that fits into keyhole 443. When the panel 430 is in the position of Figure 10, bar 438 engages appropriate recess 444 formed in the portion of aisle wall 18a that overlies the panel 430 in its closed position. When the panel 430 is in its position of Figure 9, the latch bar 438 is received in a recess 446 formed in a suitable body 448 that is secured to the aisle wall 18a in any suitable manner to project over door 430 when positioned as shown in Figure 9. Keyhole 445 is provided on the other side of device 435 to actuate element 442 by said key.

Partition or panel 430 may include a latch device of the simple draw bar type at its bottom corner 450 if so desired. In addition, an imperforate guard plate 449 may be mounted between seat 52a and aisle wall 18a for protection of the passengers when panel 430 is in its open position (see Figure 7).

As shown in Figure 8, the edge of the panel 430 that is positioned adjacent compartment door 28 in the position of Figure 8 carries the side portion of door framing or molding 186, which is lined with rubber-like material 188. The panel 430 is formed with a suitable slot or recess for cooperation with latch bars 176 and 180 of locks 174 that are carried by the doors 28. A sponge rubber strip 452 is preferably interposed between the leaf members of spring 432, as by being bonded to the elements forming one of the leaf members.

The compartments 400 are arranged for coach service by locking the doors 28 and the panels 430 in the positions shown in Figure 9. As indicated at the right hand side of Figure 7, this places the compartment 400 in wide open relationship with the aisle 19a that serves as a public walkway, and makes the compartment fully amenable to the public gaze. The seats 50a and 52a have the three positions of adjustment for coach service that are indicated in the drawings.

When privacy is desired, as for first class or sleeper service, the panel 430 is swung and locked into the position shown in Figure 10, and the door 28 unlocked by the car attendant so that the passenger using the compartment can close the compartment door 28 if so desired. When the compartment beds are to be readied for use, seats 50a and 52a are arranged by the car attendant in the positions indicated in Figure 17. Additionally, when it is desired to use the folding toilet 76, the seat 52a may be positioned as shown in Figure 17 to provide additional leg room.

The remainder of the car structure not specifically described may be similar to that shown and described in our said copending application. Bar 411 above the fixed bed 410 is provided for handhold purposes as well as for curtaining and the like found in conventional "upper" bunks.

It will be seen that our new double room arrangement permits the use of additional beds in substantially the same floor space that is occupied by single rooms. This permits an addition to the number of passengers that may be carried by a railroad car of this type for sleeper service. The fixed mounting of the upper bed in each compartment permits a substantial cut in manufacturing costs, and fills space (formed by the elimination of the compartment overlapping arrangement) that would otherwise be unoccupied. In addition, the upper bed serves as a shelf when it is not used for sleeper service.

*Improved single rooms*

Figure 4:
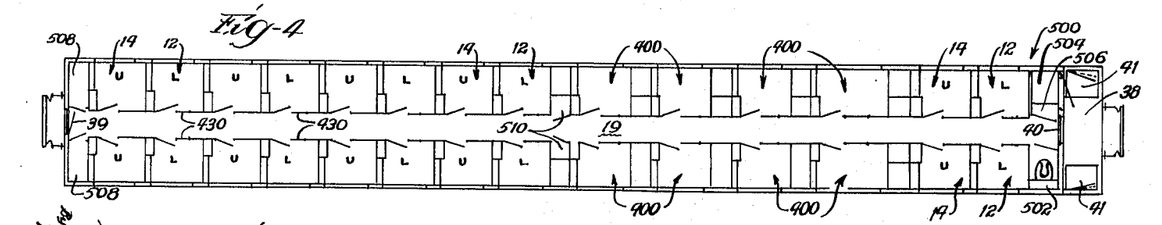
Figures 4, 5, and 6 are diagrammatic plan views illustrating three railroad car floor plans in which the principles of our present invention are incorporated.
Figure 5:
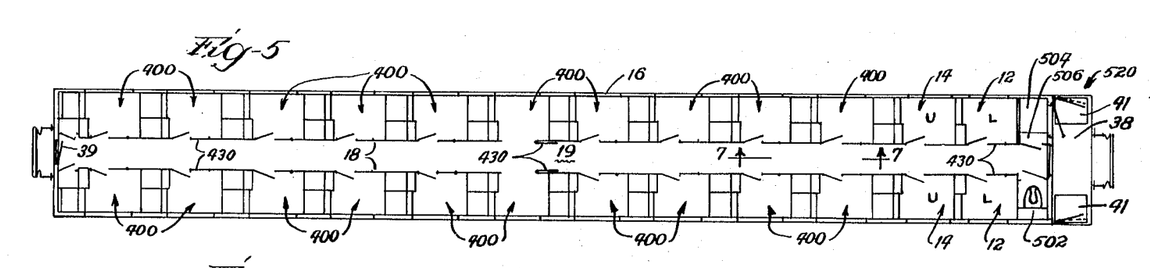

As indicated in Figures 4 and 5, we prefer to provide the lower single compartments with the swinging panel member 430. The removable panels 192 are retained in the upper compartments 14 as they are elevated above the level of the aisle floor. The single rooms otherwise remain as described in said copending application.

*Improved floor plans*

Figure 6:
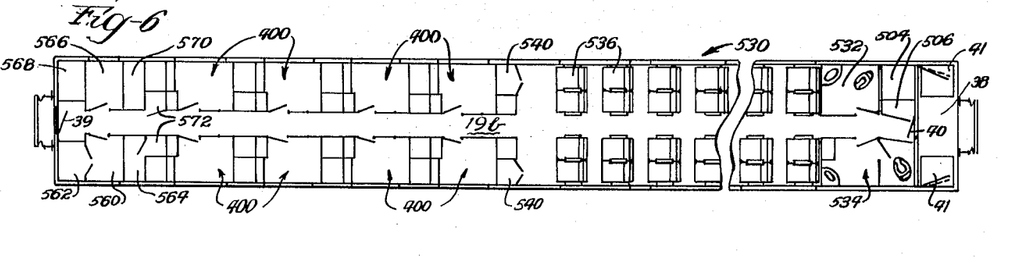

Figures 4, 5, and 6 graphically illustrate the improved capacity provided by our invention. In the illustrated floor plans, the improved double rooms are designated by reference numeral 400; the upper single rooms are identified by the letter "U" and the lower single rooms are identified by the letter "L."

The floor plan of Figure 4 includes eight double rooms 400, ten lower single rooms 12, and ten upper single rooms 14 arranged on either side of central aisle 19 in the manner indicated in Figure 4. The car 500 of Figure 4 includes vestibule 38 and stairwells 41 at one end of the car; vestibule 38 leads to door 40 which opens directly into the aisle 19 of the car. On either side of the door 40 are a public toilet 502 and electric control lockers 504 and 506, respectively. At the end of the car, door 39 provides access to the next adjacent car of the train. Lockers 508 are positioned on either side of the door 39 for storage purposes. Lockers 510 are provided where the single compartments merge with the double compartments, and preferably will extend from the floor to the ceiling of the aisle. They occupy the space corresponding to the notches 470 and wardrobe spaces 475 of the double compartments.

In the arrangement of Figure 4, for coach service, the eight double rooms have a capacity of sixteen passengers, the ten lower single rooms have a capacity of twenty passengers, and the ten upper single rooms are assigned a capacity of ten passengers, though they are capable of holding two passengers for coach service. In first class or sleeping service, the eight double rooms have a capacity of sixteen passengers, and the single lower and upper rooms each have a capacity of ten passengers each. This makes a total capacity of forty-six passengers for coach service and thirty-six passengers for sleeper service.

The floor plan of Figure 5 includes twenty double rooms 400, two upper single rooms 14, and two lower single rooms 12 arranged as indicated in the figure. The car 520 is otherwise arranged the same as car 500. For coach service, the double rooms will have a capacity of forty passengers, the lower single rooms have a capacity of four passengers, and the upper single rooms are assigned a capacity of two passengers, though they are capable of handling a total of four passengers. For first class or sleeper service, the double rooms have a capacity of forty passengers, and the single upper and lower rooms have a total capacity of four passengers. This means that the car 520 has a total coach service capacity of forty-six passengers and a total first class or sleeper service capacity of forty-four passengers.

The car 530 shown in Figure 6 includes eight double rooms 400 positioned where shown in the figure. Car 530 includes vestibule 38 and stepwells 41 which lead to door 40 that opens into an aisle 19b. Immediately adjacent the door 40 are positioned electric and control lockers 504 and 506, respectively. Adjacent to these lockers on one side of the aisle 19b is a men's public toilet 532; a women's public toilet 534 is positioned immediately across the aisle. Positioned between the men's and women's toilets and the double rooms are forty permanently mounted coach seats 536. Coach seats 536 are arranged in pairs on either side of the aisle 19b and it is contemplated that the seats be arranged in ten rows with four seats in each row transversely of the car as indicated in Figure 6. Locker space is provided at 540 in front of the coach seats 536. At the left hand end of the car (in the showing of Figure 6), buffet service is provided. The buffet structure may include a cold buffet 560 provided with refrigerator 562 and appropriate storage space 564; on the opposite side of the aisle 19b a hot buffet 566 is provided including an appropriate oven 568 and appropriate storage space where indicated at 570. Lockers are provided for storage at 572. Door 39 at this end of the car 530 provides access to the next adjacent car of the train.

In the car 530, the eight double rooms illustrated have a coach service capacity of sixteen, while the coach seats 536 provide an additional capacity of forty, making the total coach service capacity fifty-six. The capacity for night service is the same, it being assumed that the passengers occupying the coach seats 536 sleep sitting up.

The foregoing description and the drawings are given merely to explain and illustrate our invention and the invention is not to be limited thereto, except in so far as the appended claims are so limited, since those skilled in the art who have our disclosure before them will be able to make modifications and variations therein without departing from the scope of the invention.

We claim:
1. A bedroom-coach compartment for a railroad passenger car of the type having an aisle serving as a public walkway, said bedroom-coach compartment comprising an opaque aisle wall structure in part defining the aisle and formed with a doorway providing access to said room from the aisle, means including said aisle wall structure for defining a room that is adapted to serve as a passenger accommodation, a movable door mounted in said doorway, toilet facilities mounted in said room adjacent said doorway, said door in its open position blocking access to said toilet facilities, means for locking said door in said open position, said aisle wall structure being formed to define an enlarged opening adjacent said doorway and opening into said room from the aisle, and including an opaque panel member adapted to be removably mounted in said opening, said panel member being coextensive with said opening, said panel member thereby fully closing said opening when received therein, and means for removably mounting said panel member in said opening, whereby the compartment is adapted to be used at times as a coach passenger accommodation wherein said door is locked in said open position and said panel member is removed from said opening to accentuate the public exposure of said room for coach passenger service, and whereby the compartment is adapted to be used at times as a private room accommodation wherein said door is released from said open position to permit access to said toilet facilities and to permit securement of the door in its closed position and said panel member is restored to said opening to complete the enclosure of said room for sleeper service.

2. The improvement set forth in claim 1 wherein said opening is an enlargement of said doorway and said panel member is mounted for swinging movement between a position wherein it is in alignment with said aisle wall structure and closes said opening to a position wherein it is alongside said aisle wall structure and is spaced from said opening longitudinally of the aisle wall structure.

3. The improvement set forth in claim 1 wherein said opening comprises an aperture formed in said aisle wall structure separate from said doorway, and including means for physically separating said panel member from said aisle wall structure to remove same from said aperture.

4. The improvement set forth in claim 2 wherein said aisle wall structure is formed with a baggage compartment at one side of said doorway, said baggage compartment having its access opening at the aisle side of said aisle wall structure, said baggage compartment access opening and said panel member being positioned with respect to each other so that said panel member at least partially overlies said baggage compartment access opening when said panel member is moved to its last mentioned position.

5. The improvement set forth in claim 1 wherein said means for defining said room includes a side wall of the car and spaced side paneling means that extend transversely of the car, said compartment including a pair of coach seats mounted along one of the side paneling means thereof, a folding bed positioned adjacent the other side paneling means thereof adjacent the car side wall and adapted to swing from a substantially vertical position to a horizontal position in which it overlies the compartment seat of said seats that is positioned adjacent the car side wall, and a fixed upper bed structure secured in place along the car side wall and positioned over said folding bed structure and said compartment seat.

6. The improvement set forth in claim 5 wherein the other seat of said compartment is positioned on the aisle side of said fixed bed structure and comprises a bottom cushion, a back cushion, and a head cushion articulatively secured together, means for mounting said back and head cushions for positioning in vertical alignment and means for mounting said bottom cushion for generally horizontal movement whereby said cushions of said other seat may be moved from their normal seat defining relationships to dispose said back and head cushions in vertical alignment, whereby said cushions of said other seat may serve as a ladder for passengers using said fixed bed structure, and including means for releasably securing said cushions of said other seat in their said normal seat defining relationships.

7. A bedroom-coach compartment adapted to be used at times as a private room accommodation and at other times as a coach passenger accommodation, and comprising a room, a movable door providing access to said room, toilet facilities mounted in said room adjacent said door, said door in its open position blocking access to said toilet facilities, and means for locking said door in said open position.

8. A bedroom-setting room compartment for a vehicle comprising a room adapted to be used at times as a private room accommodation and at other times as a coach passenger accommodation, and defined by the vehicle side wall, transverse panelling and an aisle wall, a doorway formed in said aisle wall providing access to said room, a door mounted for swinging movement into and out of said doorway, folding seat and bed means mounted in said room, toilet facilities mounted in said room adjacent said door, said door in its open position blocking access to said toilet facilities, and means for locking said door in said open position.

9. An upper and lower bedroom-coach combination for a vehicle comprising separate upper and lower rooms adapted to be used at times as a private room accommodation and at other times as a coach passenger accommodation, and defined by the vehicle side wall, transverse side panelling, and an aisle wall, doorways formed in said aisle wall providing access to said rooms, a door mounted in each doorway for swinging movement between closed and open positions, seat and folding bed means mounted in said room, toilet facilities mounted in said room adjacent the respective doors for each room, said doors in their open positions blocking access to the respective toilet facilities, and means for locking said doors in open position.

10. A bedroom-coach compartment adapted to be used at times as a private room accommodation and at other times as a coach passenger accommodation, and comprising a room, a movable door providing access to said room, toilet facilities mounted in said room adjacent said door, said door in its open position blocking access to said toilet facilities, means for locking said door in said open position, folding seat and bed means mounted in said room, said folding bed means comprising a bed frame mounted adjacent said toilet facilities, latch means extending between said bed frame and said toilet facilities and positioned for engagement with said door when said door is moved to said open position, said latch means locking said bed frame in folded position when said door is in said open position, and biasing means for withdrawing said latch means when said door is moved out of said open position.

11. A bedroom-coach compartment adapted to be used at times as a private room accommodation and at other times as a coach passenger accommodation, and comprising panelling defining a room, a swingable door providing access to said room, seat means positioned on one side of said room, folding bed means mounted in said room on the other side of said room, said door being positioned between said folding bed means and said seat means, toilet facilities mounted in said room between said folding bed means and said door, said door in its open position blocking access to said toilet facilities, means for locking said door in said open position, and means for automatically locking said folding bed in folded position when said door is locked in said open position.

References Cited in the file of this patent

UNITED STATES PATENTS

| | | |
|---|---|---|
| 837,050 | Garnett | Nov. 27, 1906 |
| 1,977,881 | Hutt | Oct. 23, 1934 |
| 2,134,032 | Crawford et al. | Oct. 25, 1938 |
| 2,323,069 | McKinnon | June 29, 1943 |
| 2,544,980 | Brown | Mar. 13, 1951 |
| 2,546,133 | Patton | Mar. 20, 1951 |
| 2,583,960 | Murphy | Jan. 29, 1952 |
| 2,599,606 | Burgess | June 10, 1952 |
| 2,660,733 | Williams | Dec. 1, 1953 |
| 2,724,347 | Watter | Nov. 22, 1955 |
| 2,815,794 | Hendrickson et al. | Dec. 10, 1957 |

FOREIGN PATENTS

| | | |
|---|---|---|
| 1,034,827 | France | Apr. 15, 1953 |